UNITED STATES PATENT OFFICE 2,220,835

OXIDES OF PHENOLIC AMINES

Herman A. Bruson and Rush F. McCleary, Philadelphia, Pa., assignors to Röhm & Haas Company, Philadelphia, Pa.

No Drawing. Application March 14, 1939,
Serial No. 261,774

5 Claims. (Cl. 260—574)

This invention relates to new phenolic tertiary amine oxides possessing the characteristic grouping

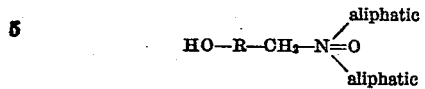

wherein R is an aromatic or substituted aromatic nucleus.

These compounds are obtainable according to the present invention by reacting with hydrogen peroxide upon the nitrogenous condensation products of methylol-forming phenolic compounds, formaldehyde and aliphatic secondary amines.

Such nitrogenous phenolic condensation products are in part already described in U. S. Patents Nos. 2,031,557; 2,033,092; 2,036,916; and 2,045,517 and are prepared by reacting one mol equivalent of a methylol-forming phenol, (that is one having a free position ortho or para to the hydroxyl group), with at least one mol equivalent each of formaldehyde and a secondary aliphatic amine such as dimethylamine or a homologue thereof. The nitrogenous products obtained as a result of this reaction contain the grouping

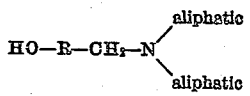

The aromatic residue R may be substituted with a wide variety of nuclear substituents. For example, R may contain one or more hydrocarbon groups, such as alkyl, cycloalkyl, aralkyl, or aryl substituents; or alkoxy, aryloxy, hydroxy, halogen, nitro, acyl, acylamino or other relatively inert radicals. Typical methylol-forming phenols include phenol, α- or β-naphthol, o-, m-, or p-cresol, xylenol (1, 2, 4 and 1, 3, 5), ethyl phenol, propyl phenol, dodecylphenol, octadecylphenol, oleyl phenol, bornyl phenol, phenyl phenol, guaiacol, resorcinol, pyrocatechol, p-acetylaminophenol, the chlorophenols, bromophenols, nitrophenol, p-hydroxystearophenone, dihydroxy-diaryl sulfones, hydroxyphenanthrenes, hydroxyanthracenes, etc.

The alkyl amine group is obtainable from a secondary amine. While, for purposes of illustration, dimethylamine is used in the examples which follow, it is possible to replace the methyl groups with ethyl, propyl, isopropyl, butyl, isobutyl, amyl, octyl, allyl, etc. or to use secondary amines possessing mixed groups, such as capryl methylamine.

Hydrogen peroxide reacts with the above phenolic tertiary amines to form the new phenolic tertiary amine oxides which are the subject of this invention. These oxides are useful as mothproofing compounds, fungicides, bactericides, and finishing agents for textiles, more particularly for fixing starches, dextrines, gums, casein, dyes, and glues on animal, vegetable or synthetic textile fibres; also, for purposes of rendering textiles water repellent, more receptive to dyestuffs, or more supple.

The reaction between hydrogen peroxide and the phenolic tertiary amine occurs readily at temperatures from 50° to 70° C. An inert organic solvent such as acetone, methyl ethyl ketone, or dioxane may be used and is recommended if the phenolic tertiary amine is solid. The reaction takes place at room temperature, but may require 24 to 48 hours for completion. At 100° C., the reaction is rapid, but in some cases decomposition is apparent. For this reason, the preferred temperature range is from about 50° to about 80° C.

The following examples illustrate this invention:

Example 1

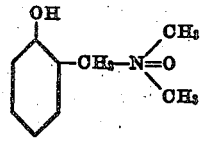

A mixture consisting of 30 g. of o-hydroxybenzyldimethylamine, 50 cc. of acetone, and 34 g. of 30% hydrogen peroxide solution was cooled to about 10° C. and allowed to stand 24 hours during which time the temperature rose to 30° C. After standing for a total of 48 hours at 30° C., the water and acetone were removed by evaporation in vacuo on a water bath held at 50° C. The residue was a colorless, water-soluble, thick, oil-like material, which gradually crystallized to colorless needles.

Example 2

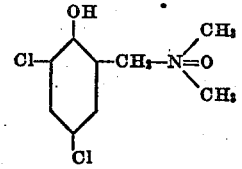

A mixture, consisting of 11 g. of 2-hydroxy-3,5-dichlorobenzyldimethylamine, 15 g. of acetone, and 11.3 g. of 30% hydrogen peroxide, was boiled under a reflux condenser on a steam bath for one and one-half hours, then allowed to stand for 24 hours at room temperature. The acetone and water were distilled off in vacuo on a water bath and the solid residue obtained was crystallized from methanol. It formed colorless crystals melting at 161–163° C. with decomposition. It is soluble in hot water and crystallizes out on cooling.

The 2-hydroxy-3,5-dichlorobenzyl-dimethylamine used above is obtained by condensing equimolecular quantities of 2,4-dichlorophenol, formaldehyde, and dimethylamine. It is a crystalline solid, M. P. 60–62° C.

*Example 3*

A mixture consisting of 15 g. of acetone, 4.9 g. of 30% hydrogen peroxide and 4 g. of the hydroxy-chlorobenzyl dimethylamine obtained by condensing equimolecular proportions of o-chlorophenol, formaldehyde, and dimethylamine was heated for one hour on a steam bath under a reflux condenser. The crystalline product obtained melted at 184–187° C. with decomposition and has the probable formula

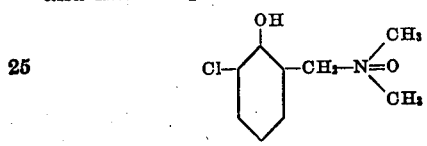

*Example 4*

A mixture consisting of 15 g. of acetone, 11.3 g. of 30% hydrogen peroxide and 14.3 g. of 2-hydroxy-3-bromo-5-ter.butyl-benzyldimethylamine was heated for 4 hours on a steam bath under reflux. When the reacted mixture was cooled, the product separated in colorless crystals, melting, after recrystallization from 50% alcohol, at 150–153° C. with decomposition. It has the probable formula

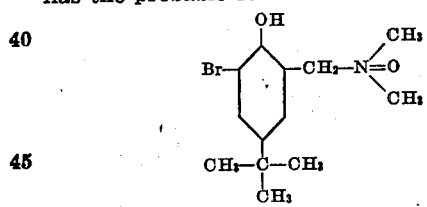

The 2-hydroxy-3-bromo-5-ter.butyl-benzyl dimethylamine used above was a colorless, crystalline compound, M. P. 96–97° C., obtained by condensing 2-bromo-4-ter.butylphenol with one mol each of formaldehyde and dimethylamine.

*Example 5*

A mixture consisting of 15 g. of acetone, 11.3 g. of 30% hydrogen peroxide and 15.3 g. of 2-hydroxy-3-bromo-5-phenylbenzyl-dimethylamine was heated for 4 hours under reflux on a steam bath. When the reacted mixture was cooled, the product separated in colorless crystals which melt at 169–170° C. with decomposition, after crystallization from alcohol. It has the probable formula

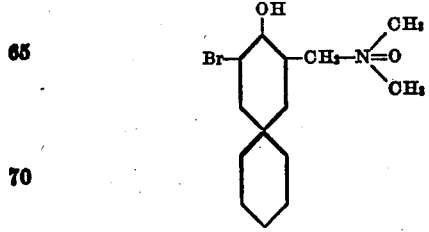

The 2-hydroxy-3-bromo-5-phenylbenzyldimethylamine used above was prepared by condensing 2-bromo-4-phenylphenol with one mol equivalent each of formaldehyde and dimethylamine. It is a crystalline solid, M. P. 91° C.

*Example 6*

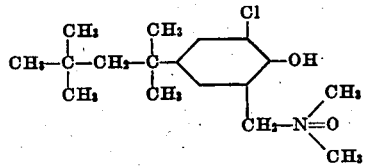

A mixture consisting of 15 g. of 2-hydroxy-3-chloro-5-α,α,γ,γ-tetramethylbutyl-benzyldimethylamine, 11.3 g. of 30% hydrogen peroxide and 15 g. of acetone was heated for 5 hours at 55–60° C. under a reflux condenser. The product was filtered off and recrystallized from alcohol. M. P. 165–168° C. (with decomposition).

The 2-hydroxy-3-chloro-5-α,α,γ,γ-tetramethylbutyl-benzyl-dimethylamine used above was obtained by condensing one mol each of formaldehyde and dimethylamine with one mol of 2-chloro-4-α,α,γ,γ-tetramethylbutylphenol. It is a crystalline solid, M. P. 77–78° C.

*Example 7*

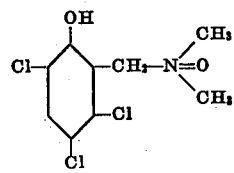

A mixture consisting of 15 g. of acetone, 11.3 g. of 30% hydrogen peroxide and 13 g. of 2-hydroxy-3,5,6-trichlorobenzyldimethylamine was heated for 4 hours at 55–60° C. under a reflux condenser. The product was filtered off and recrystallized from alcohol. It formed colorless crystals, M. P. 159–160° C. (with decomposition).

The 2-hydroxy-3,5,6-trichloro-benzyldimethylamine used above was a crystalline solid, M. P. 96° C., which was obtained by condensing equimolecular proportions of 2,4,5-trichlorophenol, formaldehyde, and dimethylamine.

*Example 8*

A mixture of 30 g. of acetone, 23 g. of 30% hydrogen peroxide and 20 g. of dimethylaminomethyl-β-naphthol was stirred for 40 hours at room temperature. The product was filtered off and recrystallized from alcohol. It formed colorless crystals, M. P. 155–156° C. (with decomposition), corresponding to the probable formula

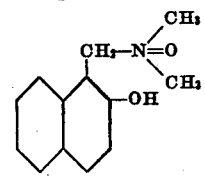

The dimethylaminomethyl-β-naphthol used above was a crystalline solid, M. P. 75° C., obtained by condensing one mol each of formaldehyde, β-naphthol and dimethylamine.

*Example 9*

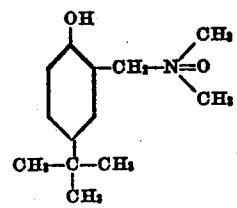

A mixture consisting of 10.3 g. of 2-hydroxy-5- ter. butyl-benzyl-dimethylamine, 15 g. of acetone, and 11.3 g. of 30% hydrogen peroxide was boiled for 2 hours under reflux. The product crystallized after standing for several days in a refrigerator and melted at 96° C. It contained by analysis 5.74% nitrogen, indicating that the product was the monohydrate of the above amine oxide. The 2 - hydroxy - 5 - ter. butyl-benzyl-dimethylamine used above was a colorless oil (B. P. 120–130° C/2 mm.) which was obtained by condensing equimolecular proportions of formaldehyde, dimethylamine and p-ter.butylphenol.

Example 10

To a solution of 75 g. of p,p'-dihydroxydiphenyl sulfone in 100 cc. of methanol and 144 cc. of aqueous 25% dimethylamine solution there was added, with cooling and stirring, 74 cc. of 30% formaldehyde solution. After standing for 24 hours at room temperature, the mixture was evaporated to dryness under reduced pressure. A brittle resinous mass was obtained which contained by analysis 8.2% nitrogen.

19 g. of the above resin was dissolved in 30 g. of acetone and 22.5 g. of 30% hydrogen peroxide added. The mixture was allowed to stand for 48 hours at room temperature. The mixture was then evaporated to dryness in vacuo. The amine oxide obtained was a brittle, resinous, water-soluble mass, containing 6.83% nitrogen by analysis.

Example 11

To a solution of 228 g. of p,p'-dihydroxydiphenyl propane-2 in 400 cc. of methanol and 404 cc. of aqueous 25% dimethylamine solution there was added dropwise, with cooling and stirring, 204 cc. of 30% formaldehyde solution at 25–30° C. Stirring was continued for three hours thereafter and the mixture allowed to stand for 24 hours. The oily layer was separated, washed with water, and dried in vacuo. It was a dark, sticky mass, containing 7.6% nitrogen, which gradually crystallized. It consisted primarily of material having the formula

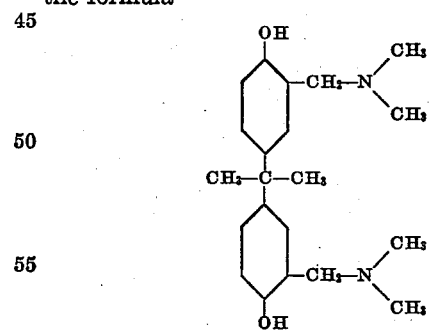

or

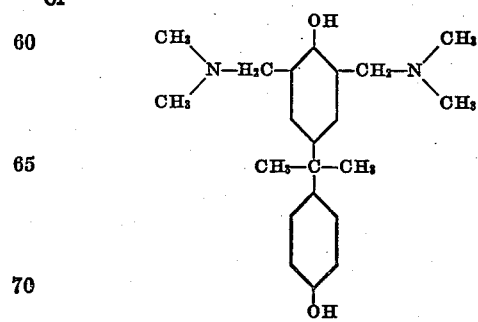

or a mixture of both.

A mixture consisting of 18 g. of the above mass in 30 g. of acetone and 22.6 g. of 30% hydrogen peroxide was boiled under reflux for 3 hours. The solvent and water were evaporated off under reduced pressure, leaving the amine oxides as a viscous, sticky, water-soluble oil which did not crystallize.

Example 12

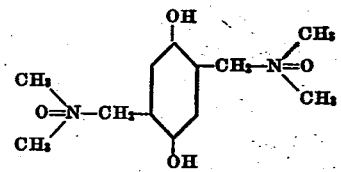

A mixture consisting of 50 g. of acetone, 22.6 g. of 30% hydrogen peroxide and 11.2 g. of di-(dimethylaminomethyl) hydroquinone was refluxed for two hours, then allowed to stand at room temperature for 48 hours. The product was a crystalline solid, melting at 196–197° C. (with decomposition).

The di-(dimethylaminomethyl) hydroquinone was obtained by condensing hydroquinone with two molecular equivalents each of dimethylamine and formaldehyde. It is a colorless, crystalline solid melting at 189-190° C.

When more than one ortho or para position in a phenolic compound is available for substitution, it is possible to introduce more than one dialkyl methylamine group into the phenolic nucleus and to convert each amine group into an amine oxide group. Instances of the substitution of two groups have been given in Examples 11 and 12, but it is possible to introduce still more groups when the proper positions are free. Three groups are readily introduced into phenol and more may be substituted in polynuclear phenols. Furthermore, the phenols may possess more than one -OH group. The amine oxides which are herein disclosed may, therefore, be represented by the general formula

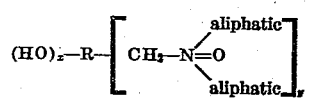

wherein R represents an aryl nucleus, and $x$ and $y$ each represents a small whole number the sum of which is less than 6.

We claim:

1. A phenolic tertiary amine oxide of the formula

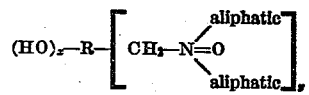

wherein R represents an aryl nucleus, and $x$ and $y$ each represents a small number, the sum of which is less than six.

2. A phenolic tertiary amine oxide of the formula

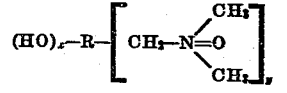

wherein R represents an aryl nucleus, and $x$ and $y$ each represents a small number, the sum of which is less than six.

3. A phenolic tertiary amine oxide having the formula

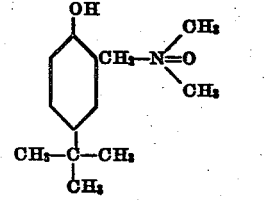

4. A phenolic tertiary amine oxide having the formula
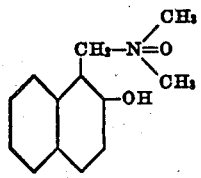
5. A phenolic tertiary amine oxide having the formula
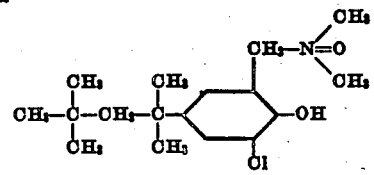
HERMAN A. BRUSON.
RUSH F. McCLEARY.